(12) United States Patent
Powalowski et al.

(10) Patent No.: US 8,875,036 B1
(45) Date of Patent: Oct. 28, 2014

(54) POST EDIT LOCALIZATION EVALUATION IN OFFLINE CONTEXT OF AN APPLICATION

(75) Inventors: Piotr Powalowski, Zielona Gora (PL); Jun Yin, Shanghai (CN); Peter Yung Sen Chen, Los Altos, CA (US)

(73) Assignee: Google Inc., Mountain View, CA (US)

( * ) Notice: Subject to any disclaimer, the term of this patent is extended or adjusted under 35 U.S.C. 154(b) by 187 days.

(21) Appl. No.: 13/222,160

(22) Filed: Aug. 31, 2011

(51) Int. Cl.
*G06F 3/048* (2013.01)

(52) U.S. Cl.
USPC .......................................................... 715/765

(58) Field of Classification Search
USPC .......................................................... 715/765
See application file for complete search history.

(56) References Cited

U.S. PATENT DOCUMENTS

| | | | |
|---|---|---|---|
| 8,306,255 B1 * | 11/2012 | Degnan | 382/100 |
| 2006/0161596 A1 * | 7/2006 | Chan et al. | 707/201 |
| 2006/0287844 A1 * | 12/2006 | Rich | 704/2 |
| 2007/0065044 A1 * | 3/2007 | Park et al. | 382/305 |
| 2007/0233811 A1 * | 10/2007 | Rochelle et al. | 709/219 |
| 2008/0127045 A1 * | 5/2008 | Pratt et al. | 717/104 |
| 2011/0179073 A1 * | 7/2011 | Nilsson | 707/769 |
| 2011/0208805 A1 * | 8/2011 | Kasetty et al. | 709/203 |
| 2013/0006603 A1 * | 1/2013 | Zavatone et al. | 704/2 |

* cited by examiner

*Primary Examiner* — William Bashore
*Assistant Examiner* — Jeanette J Parker
(74) *Attorney, Agent, or Firm* — Remarck Law Group PLC (57) ABSTRACT

Applications can be localized by localization experts to allow them to be used by a broader customer base. The localization can be done given interface context to produce more applicable results. Multiple localization experts may be given an editable interface of the application and may provide multiple localizations based on the editable interface of the application. Multiple evaluators may evaluate the localizations provided by the multiple localization experts. Multiple developers may extract localization data and the localization data may be incorporated into the application and may result in a localized application.

23 Claims, 4 Drawing Sheets

POST EDIT LOCALIZATION EVALUATION IN OFFLINE CONTEXT OF AN APPLICATION

BACKGROUND

A localization expert can modify an application for numerous reasons, such as, to make the application more useful for a larger audience, to make the application more applicable to a different culture, to account for differences in distinct markets, etc. The application may be modified by modifying a resource such as a text string, color and style settings, image and style icon files, sound files, etc. For example, software originally designed for the United States market may generate an error message containing a text string in English if a user clicks a specific button within the software. A localization expert may localize the error message such that a Chinese speaking user in the Chinese market may be able to understand the localized error message in a similar way that an English speaking user in the United States market understands the original message. Accordingly, the same or similar software can be used by a larger number of users.

The localization expert may require context data regarding the application to provide a localization. Without sufficient context data, the localization provided by the expert may not be correct for the application as the meaning of the resource to be localized may be ambiguous. For example, if the localization expert is only given a list of the resources to be translated from one language to another, the translation provided by the expert may not accurately reflect the meaning of the original resources. More specifically, if the application contains multiple resources with the phrase "Enter", a localization expert with only a list of the resources to be localized may not be able to distinguish between the "Enter" which requires pressing the Enter Key and "Enter" which grants a user access to a portion of the resource.

Multiple localization experts may localize an application simultaneously. However, receiving multiple localizations from multiple localization experts in a non-centralized manner can be time consuming and expensive, especially due to the lack of communication between the various users involved with the localization process.

Accordingly, there is a need for providing context data regarding the application to one or more localizations experts. More specifically, there is a need for providing context data regarding the application to multiple users to synchronize the localization process.

BRIEF SUMMARY

According to an embodiment of the disclosed subject matter, context information about an interface can be received. At least one resource file containing at least one file resource can be received. An interface resource based on the context information to an interface can be identified. The interface resource can be rendered editable in an interface to at least one user. A localization edit of the interface resource can be received from at least one user. A file resource that corresponds to the interface resource can be identified. The corresponding file resource in the resource file based on the localization edit of the interface resource can be modified. The modified file resource may be rendered to at least one evaluator. An evaluation message from the at least one evaluator may be received.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
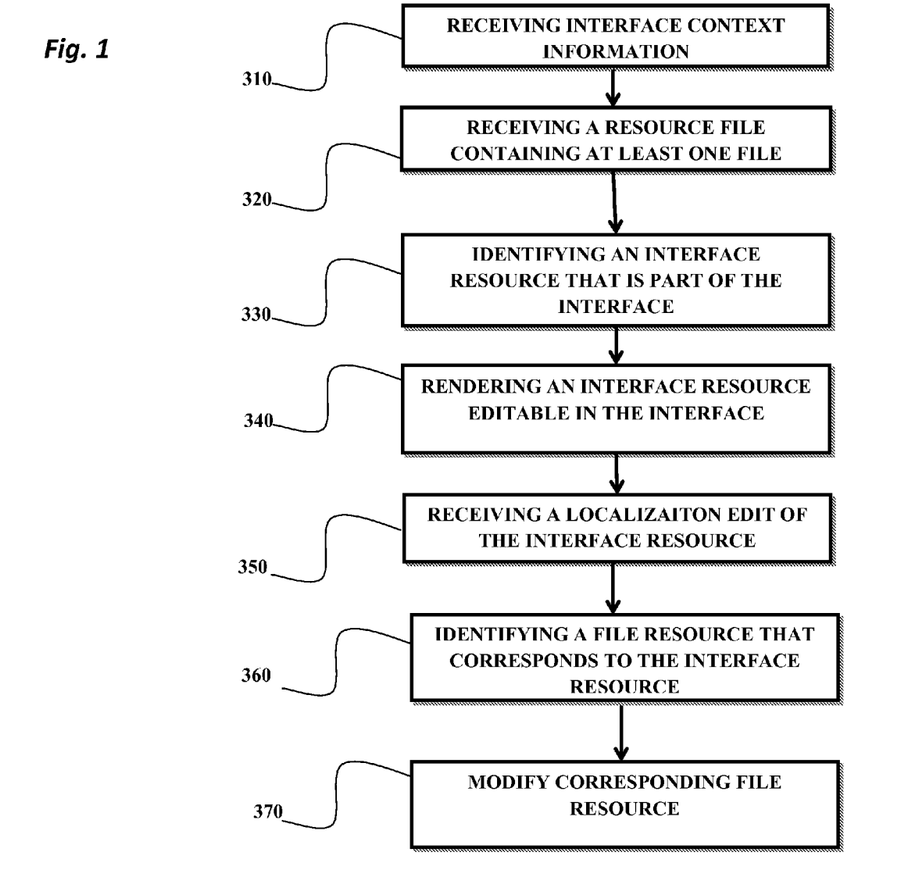
FIG. 1 shows a diagram explaining the in-context localization of an application

As shown in FIG. 1, according to embodiments of the disclosed subject matter, context information about an interface of an application can be provided to a localization expert. Context information about an interface can include a representation of all or a part or parts of the interface and can include text data, image data, audio data, video data, color and style settings, HTML, XML, a CSS data, layout information, executable or interpreted code, etc., and any other information relating to the content, layout and behavior of all or part of a user interface. The context information may be received by the implementation 310. The context information may be based on one or more of a variety of applications, including but not limited to, web based applications, mobile applications, desktop applications, a snapshot of an application, etc., any other applicable application or a combination thereof. The context information may be used to render a localization interface using, at least in part, HyperText Markup Language and other information useful in displaying information and may contain interface resources that may be editable within the interface 340. Further, the localization interface may be rendered based at least in part on a resource file 320 containing file resources which are associated with localizable aspects of the application. The file resources 330 may contain a list of pairs which identify the resource and the content of the resource. The format of the file resources may vary based on the application, localization expert, developer, etc. The format may be based on, but not limited to, java properties files, GWT/UI Binder (Java properties including comments for resources), XML format, etc., or a combination thereof. For example, a Java properties resource file can contain:

project.message.okay=Press okay to continue
   project.message.user=User % s logged out
   project.error.noData=Found only % d data points!

A GWT/UI Binder formatted resource file can contain:

# Shown to user in registration form.
   project.message.okay=Press okay to continue
   # Shown to user on log out event. Placeholder % s shows user name.
   project.message.user=User % s logged out An XML format resource file can contain:

```
<message>
    <id>project.message.user</id>
    <text>User %s logged out</text>
    <comment>Shown to user on log out event.</comment>
    <placeholders>
        <placeholder>
            <text>%s</text>
            <example>John</example>
            <comment>Placeholder %s shows user
            name.</comment>
        </placeholder>
    </placeholders>
</message>
```

Context information that can be used to render a localization interface may be based on a web-based application and can be at least partly generated by activating a browser plugin. The plugin may extract context information from the application and may further extract such information based upon multiple application interface instances (e.g., screen shots) to determine any changes from one or more interface instances to another. Based on the application interface or changes across interface instances, the plugin may obtain application interface resources. These interface resources may be aspects of the interface that can be made editable by the localization expert in a localization interface and may directly correspond to file resources of the application. The interface resources may be obtained by sending a request for a Domain Object Model tree (DOM tree) and Cascading Style Sheet data (CSS) to an application (such as a stand-alone program, an online service, etc.) and detecting interface resources based on the request. For example, Web based applications, the user can install and use a browser plug-in that detects when the page that user is viewing has changed. This can be done by listening to the public notifications and/or events of the browser. All or part of the structure of the page can be obtained when the plug-in can request from the browser a current DOM tree of the page elements and their CSS styling. This can contain exactly the interface elements (resources) present (e.g., visible, present but not displayed, etc.) at the moment, including those that may be dynamically created by JavaScript, loaded resources and elements based on retrieved data requests. The plug-in can send all or part of the data to a server for final assembly. The data can include not only HTML and CSS code, but also other resources, such as images and backgrounds used in the page. On server side, non-interface elements of the DOM tree can be removed and CSS styles can be added as one of the nodes of the DOM tree. The result may be transformed into HTML text or any other suitable form.

Context information based on a mobile application may be generated by extracting embedded text from within the mobile application. The mobile application may be an application for any mobile technology including mobile phones (e.g., QWERTY based phones, touchscreen phones, flip based phones, slide based phones, operating systems loaded phones, etc.), tablets (e.g., capable of processing audio-visual data including books, periodicals, movies, music, games, and web content which may be QWERTY based, touch screen based, flip based, etc.) or any other applicable mobile technology. The extraction may be conducted through Optical Character Recognition (OCR) techniques, by reading text in HTML, etc. The implementation may extract location data corresponding to interface resources (e.g., locations at which photographs or videos were taken, stored locations of the mobile platform at the time of a phone call or text message (sent or received), etc. The location data can be used to allow the localization expert to localize elements of the application by allowing a localization expert to visually see the location of the interface resource.

Some mobile systems allow developers to run their applications on a desktop machine in a emulated mode. These systems grant the emulator program access to basic structure of presented elements for the purpose of rendering. To capture snapshots of mobile applications, the user can connect the mobile device to desktop computer and runs an application in accordance with embodiments of the disclosed subject matter, the application can access the interface elements structure and their basic information and retrieve the position (coordinates in mobile screen) for each displayed element and embedded text (if any). It can also retrieve an image and/or screenshot of a widget as an image file, such as a .jpeg or .png file. The retrieved data can be sent to server and assembled into HTML structure. The server can create a HTML file for each snapshot taken. Each file can have a screenshot of the whole application set as a background and can contain HTML tags representing interface elements. For each interface element found in the interface, the application can place a <div> HTML element in an absolute position, according to the coordinates found. The <div> element obtains a screenshot image as a background and text found as a content. The resulting HTML page can be transformed into a HTML text snapshot.

A localization interface based on a snapshot may be generated by extracting context information and application interface resources from an application interface snapshot by extracting embedded text or images within the application interface. The extraction may be conducted through an OCR technique, pattern recognition, file extraction or any other applicable extraction techniques. An extraction based on a snapshot may be based upon multiple snapshots of the application. A more recently captured snapshot can be compared to a less recently captured snapshot to determine if there are any differences between the two snapshots. If there are differences, the implementation may detect new interface resources based on those differences. For example, if a new message, alert, window, picture, etc., appears in a second snapshot compared to a first snapshot, the new element can be determined to be an interface resource that may be suitable for localization. For widget detection, sub-parts of the screenshots can be compared with known widget images or rectangular shapes can be detected on the screenshots. Based on the detection result, an HTML snapshot can be created. For example, a new HTML page can be created with a background of the application screenshot. For all detected elements (text, widgets, other resources, etc.) absolutely positioned <div> elements can be placed in the page. The resulting HTML page can be transformed into a HTML text as a final snapshot.

A similar approach can be used for different types of desktop applications that allow programmatic access to the presented interface and/or where an operating system can provide details of presented interfaces. In those cases, a desktop application in accordance with embodiments of the disclosed subject matter can access data of the captured application directly (when possible) or through an emulator. Based on data found, the interface can be recreated as an HTML page, which can be sent to the server.

Interface resources can be aspects of the application interface that can be edited by a localization expert using a localization interface. For example, an application message that includes the word "Welcome!" may be shown in a localization interface in a context similar or identical to the way it appears in the corresponding application interface. The localization interface may (perhaps unlike the application interface) render this message in such a way as to make it editable by the localization expert, e.g., by modifying "Welcome!" to "Bienvenue!" to help localize an English-based application interface to a French language user base. In this manner, the localization expert can visually see the context in which the interface resource is embedded in the interface, and localize the interface resource accordingly. Accordingly, the localization expert can provide a localization edit 350 of the interface resource directly within the provided localization interface. The localization interface can act as a What You See Is What You Get (WYSIWYG) editing facility to localize application interface resources. By preserving the context information of the application interface in the localization interface, the localization expert can better determine the appropriate localization edits to accurately convey the best meaning possible to the user in the localized environment.

According to embodiments of the disclosed subject matter, the implementation may receive the resource file associated with an application, which contains file resources. The resource file containing the file resources can be associated with the application such that the resource file is used when compiling the application and determines, at least in part, what elements are included in the application interface. The application based on the resource file can contain aspects that may be localizable. File resources within the resource file may be associated with the aspects of the application which may be localizable. In some embodiments, each file resource may correspond to a localizable aspect in the application interface. Accordingly, editing a file resource within the resource file can subsequently alter an application when the application is later compiled using the edited (localized) resource file.

A localization file resource can be a file containing localization interface resources and/or references thereto. The localization file resource can be based upon an application file resource provided by, for example, the developer of the application; information extracted from outputs of one or more instances of the application itself, such as from HTML code generated by the application; or resources extracted from one or more screenshots of the application interfaces. A localization file resource corresponding to a localization interface resource may be identified 360. The identification may occur before or after rendering a localization interface to a localization expert. This correspondence can be used to relate an localization interface onscreen edit to a resource in the localization resource file. Thus, a change to the onscreen resource can be reflected in a change to the corresponding resource in the localization resource file, 370.

The localization file resource that corresponds to the resource modified onscreen by the localization expert can be identified by comparing the localization resource being modified to resources in the localization file. A match can be made based upon similarity. Once the corresponding localization file resource is identified, it can be modified in accordance with the change made onscreen by the localization expert. The modified localization resource file can later be used directly or to generate an application resource file that can be compiled or included by the developer with the rest of the application. The result can be a localized application in which the application resources have been modified by the localization expert.

According to some embodiments of the disclosed subject matter, the implementation may identify a localization file resource corresponding to an interface resource by converting the file resource to a regular expression and comparing the regular expression to the interface resource. For example the file resource may be:

"The user % s has % d messages."

A regular expression of the file resource can be:

"The user [^< >]* has [0-9]+messages."

The regular expression may be compared to an interface resource (e.g., HyperText Markup Language text of the interface) and a match may be identified based on the comparison. The file resource associated with the regular expression can then be localized based on localization edits to the interference resource. The regular expressions can be matched against HTML text of the snapshot. For each expression, many matches can be allowed in HTML text and can be considered a possible replacements of a message. After the matching is done, the resulting matches can be compared with each other for conflicts. Two matches can be in conflict if they match a common part of HTML text. The conflict resolution can be done based on a set of predefined rules that can dictate which one of the conflicting matches should be ignored. For example, a rule can be to ignore the shorter match. If matches are of equal length, they can be compared without placeholder matches and the shorter one can be ignored.

According to some embodiments of the disclosed subject matter, a user can be provided with an interface that permits the user to manually match a localization interface resource to the appropriate file resource. For example, the user may be provided with a list of the resources in a localization resource file and given the opportunity to match an onscreen resource to one or more resources in the list.

According to some embodiments of the disclosed subject matter, file resources corresponding to an interface resource may be identified by individually labeling the file resources to create specially augmented default file resources. Labeling the file resources may distinguish a file resource from other file resources within the resource file. The labels may be inserted both in the beginning and the end of a file resource and can accordingly mark the beginning and end of the resource. For example, a file resource may originally be:

"User % s is done"

An augmented version of the file resource can be:

"{U+1234} User % is done {U+1235}."

A corresponding interface and interface resources may be generated based on the augmented default file resources and rendered to a localization expert. The labels may include non-rendered characters that may be detectable by a machine, but not appear to a user in the localization interface. If the localization expert provides a localization edit through the localization interface, the corresponding resource in the localization file resource can be identified based upon comparing the labels around the onscreen resource being edited and the labels around resources in the localization resource file. The corresponding localization file resource may be modified based on the localization edit, and subsequently a localized application may be compiled based upon the modified localization resource file. By matching the localization edit within the localization interface with the correspondingly labeled resource element in the localization resource file, the implementation can reduce or eliminate improper localizations caused by mismatches. As an illustrative example, as shown in Table 1, the term "Enter" which represents asking a user to press the enter key corresponds to the third file resource within the localization resource file. Without any labeling, the second and third file resources may not be differentiable. However, after labeling the resources, each resource is distinguished by the labels assigned to the beginning and end of the resource. Thereafter, the generated interface resources can contain a matching label as shown in Table 1. The interface resource can therefore be matched to the corresponding augmented default file resource.

TABLE 1

| Resource file location | Context | File Resource | Augmented Default File Resource (DAFR) | Interface Resource based on DAFR |
|---|---|---|---|---|
| 1 | Exit page | Exit | {U+1000}Exit {U+1001} | {U+1000}Exit {U+1001} |
| 2 | Enter page | Enter | {U+2000}Enter {U+2001} | {U+2000}Enter {U+2001} |
| 3 | Press Enter key | Enter | {U+3000}Enter {U+3001} | {U+3000}Enter {U+3001} |
| 4 | Agree to terms | Agree | {U+4000}Agree {U+4001} | {U+4000}Agree {U+4001} |

A localization of the phrase "Enter" in the application which asks the user to press the Enter Key would be matched only with the corresponding localization resource file resource. Accordingly, a localized version of the phrase "Enter" can be matched with the proper augmented default file resource and the use of that file resource to compile the application can result in a properly localized application.

A localization interface built with captured context information can be made editable in accordance with embodiments of the disclosed subject matter. For example, resources in a snapshot HTML code version of an application interface can be marked with HTML tags containing custom attributes with data describing the resource. When the snapshot is loaded in the application, those marking tags in the snapshot are identified and can be assigned events that will display a localization interface that makes the resource editable by the localization expert. For example, consider two resources:
    test.message.1="Logout"
    test.message.2="Hello % s!"
The original snapshot HTML text contains:
    . . . <div>Hello John!<span>Logout</span></div> . . . .
The snapshot HTML with markings can be:
    . . . <div>
      <span msg="test.message.1">Hello John!</span>
      <span><span msg="test.message.2">Logout</span></span>
    </div> . . . .
Code can be added:

```
// Load the snapshot to an iframe element
iframe.url ='http://my.server.com/snapshot?id=1234'
// after loading find all marked elements:
var snapshotHtml =iframe.getHtmlNode( );
var allSpanElements =
    snapshotHtml.getElementsByTagName('span');
for (var span : allSpanElements) {
    // look for span elements with a 'msg' attribute
    if (span.hasAttribute('msg')) {
        // add event happening when user clicks on the message
        span.onClick(function(e) {
            var messageId =e.target.getAttribute('msg');
            // retrieve data of the message from backend
            var messageData =
                BackendService.getDataForMessage(messageId);
            // Show the pre-existing UI
            // element with details of the message
            TranslationUIElement.getInstance( )
                .show(messageDetails);
        });
    }}
```

Figure 4:
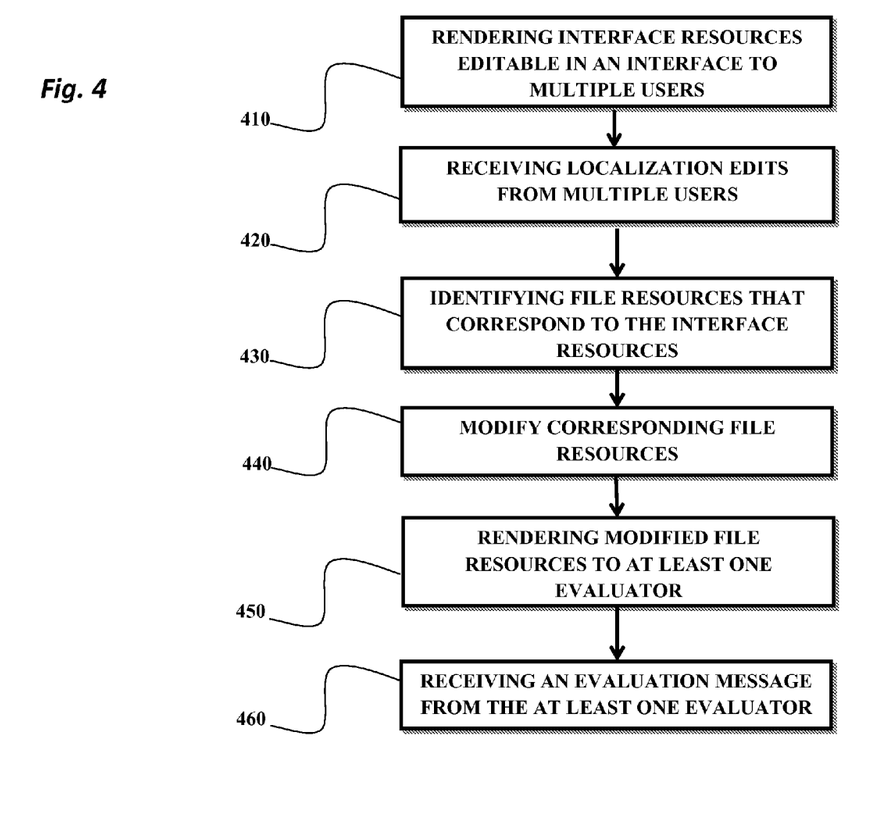
FIG. 4 shows a diagram explaining receiving localizations and evaluations from multiple users according to an embodiment of the disclosed subject matter.

As shown in FIG. 4, according to embodiments of the disclosed subject matter, an editable interface containing at least one localization interface resource may be rendered to one or more localization experts. The editable interface may be rendered to multiple localization experts simultaneously 410 and the implementation may receive multiple localization edits 420 to the multiple editable interface resources from the multiple localization experts simultaneously. The implementation may identify the multiple localization file resources corresponding to the multiple localization interface resources 430. The implementation may modify the corresponding localization file resources 440 based on the respective localization edits provided by the multiple experts and thereafter may compile a localized version of the application based on the multiple localizations.

In an illustrative example of an embodiment of the disclosed subject matter, the implementation may render the same localization interface to two localization experts, Andrew and Bert. The localization interface may represent an application containing two text boxes, Box 1 and Box 2. Box 1 and Box 2 may be rendered as editable interface resources within the localization interface, and may be localized directly by Andrew and Bert. The localization for this example may be translations of texts within Box 1 and Box 2. Upon receiving the interface, Andrew may localize Box 1 to translate the text contained within Box 1 from English to Spanish. Simultaneously, Bert may localize Box 2 to translate the text contained within Box 2 from English to Spanish. The implementation may accept both localization edits to the localization interface resources simultaneously and may modify both localization resource files which correspond to the localization interface resources.

The implementation may receive localization edits from two or more localization experts based on the same interface resource of the interface. The implementation may compare the multiple localization edits to determine if they are the same. If they are not the same and are for the same interface resource, then the localization edits for the same localization interface resource may be assigned a conflict value of 1, and may be determined to be conflicting. If they are the same and are for the same interface resource then the localization edits may be assigned a conflict value of 0, and may be determined to be non-conflicting. If the two or more localization edits are for different localization interfaces then they may not be assigned a conflict value or may be assigned a conflict value of 0. The comparison to determine the conflict value may be implemented using an applicable comparison technique such as, but not limited to, exact match, edit distance, BLEU score, NIST score, Meteor score, etc., or a combination thereof.

In an illustrative example of the disclosed subject matter, the implementation may render the same interface to the two localization experts, Andrew and Bert. The interface may represent an application containing one text box, Box A. Box A may be an editable interface resources within the interface, and may be edited directly by Andrew and Bert. The localization for this example may be a translation of the text within Box A. Upon receiving the interface, Andrew may localize Box A to translate the text contained within Box A from English to Spanish. Simultaneously, Bert may localize Box A to translate the text contained within Box A from English to Spanish as well. If Andrew and Bert provide the same localization edit based on exact match, then the localization edits may receive a conflict value of 0, and may be determined to be non-conflicting. If Andrew and Bert provide dissimilar localization edits based on exact match, then the localization edits may receive a conflict value of 1, and may be determined to be conflicting.

The implementation may determine a rank for each localization expert. The rank may be based on the localization expert's localization history or any other applicable metric such as, but not limited to, human evaluation of the localization expert, experience based ranking, random ordering, etc., or a combination thereof. If the implementation receives multiple localization edits and the localization edits are determined to be conflicting, then the implementation may accept only one of the multiple localization edits based on the rankings of the localization experts providing the localizations. If a conflict exists, the one localization edit provided by the localization expert with the lowest (best) ranking may be the localization edit accepted by the implementation. Accordingly, the localization expert best able to provide localization edits, as determined by the ranking, provides the accepted localization edit, allowing for an optimal localization of the application. For example, as shown in Table 1, the three localization experts, Andrew, Bert and Carl all provide different localizations for the resource "Enter". The localization, in this example, is a translation from English to Spanish. The implementation may determine that the conflict value for the localizations is 1 and that a conflict exists based on the difference in the three localizations. The implementation may select the localization provided by Andrew as he is the localization expert with the lowest (best) ranking. As indicated in Table 1, the rank in this example is based on the number of years of experience which each localization expert has.

TABLE 1

| Localization expert | Localization of "Enter" | Rank | Rank metric (Years of Experience) |
|---|---|---|---|
| Andrew | Entrar | 1 | 6 |
| Bert | Escribir | 2 | 4 |
| Carl | Hola | 3 | 1 |

According to embodiments of the disclosed subject matter, a modified localization file resource corresponding to a localized interface resource may be rendered to at least one evaluator 450. The evaluator may evaluate the quality of the localizations based on aspects of the localization such as, but not limited to, content data, length data, aesthetic data, translation data, text data, image data, audio data, video data, color and style settings, HTML, XML, a CSS data, layout information, executable or interpreted code, etc., and any other information relating to the content, layout and behavior of all or part of a user interface. The implementation may receive an evaluation message 460 based on the evaluator's evaluation of the quality of the localizations. The evaluation message may contain components such as, but not limited to, a reject component, an accept component, a modify component, or a combination thereof. An evaluation message with an accept component may indicate that the localization received by the evaluator is determined to be good and therefore the implementation may not further modify the modified file resource evaluated by the evaluator, or commit the localization to a localization file, e.g., to modify the localization file. An evaluation message with a reject component may indicate that the localization received by the evaluator is determined to be bad and therefore the implementation may further modify the modified file resource evaluated by the evaluator or not commit the localization to the localization file. A further modification may revert the file resource back to the state in which it was prior to the localization. An evaluation message with a modify component may indicate that the localization received by the evaluator is determined to be bad and therefore the implementation may further modify the modified file resource evaluated by the evaluator. For example, the evaluation message with a modify component may specify a "fix", such as an edit (modification) of the submitted localization, a replacement or an action, such as referring the submitted localization to another localization expert, re-submitting the localization task to another localization expert, etc. The further modification may be a different localization than the localization provided to the evaluator.

According to embodiments of the disclosed subject matter, the modified localization file resource corresponding to a localized interface resource may be rendered to two or more evaluators. The file resource may be rendered to multiple evaluators simultaneously and the implementation may receive multiple evaluation messages from the multiple evaluators. The implementation may compare the multiple evaluation messages to determine if they are the same. If they are not the same and are for the same interface resource, then the evaluation messages for the same interface resource may be assigned a conflict value of 1, and may be determined to be conflicting. If they are the same and are for the same interface resource then then the evaluation messages may be assigned a conflict value of 0, and may be determined to be non-conflicting. If the two or more evaluation messages are for different localization interfaces then they may not be assigned a conflict value or may be assigned a conflict value of 0. The comparison to determine the conflict value may be implemented using an applicable comparison technique such as, but not limited to, exact match, edit distance, BLEU score, NIST score, Meteor score, etc., or a combination thereof.

The implementation may determine a rank for each evaluator. The rank may be based on the evaluator's evaluation history or any other applicable metric such as, but not limited to, human evaluation of the evaluator, experience based ranking, random ordering, etc., or a combination thereof. If the implementation receives multiple evaluation messages and the evaluation messages are determined to be conflicting, then the implementation may receive only one of the evaluation messages. The one evaluation message provided by the valuator with the lowest (best) ranking may be the evaluation message received by the implementation. A best ranking for an evaluator, localization expert or any other appropriate entity may be the highest ranking or in accordance with any ranking system that can help to distinguish a superior entity from an inferior entity. In some cases, the second, third, fourth, etc., best entity's submission may be chosen based upon, e.g., the unavailability of a higher-ranked submission or the unsuitability of a higher-ranked submission.

According to embodiments of the disclosed subject matter, a developer may have access to an action or a product of the at least one localization expert or the at least one evaluator or both, in real-time. More specifically, the developer may have access to actions or products such as, but not limited to, a localization edit of the localization interface, the modification of a localization file resource, an evaluation or a combination thereof. The real-time access may be visually seeing the action or product as a localization expert or evaluator conducts the action or produces a product. A modified localization file resource may be extracted based on the developer access to the action or product. The extracted modified file resource may be used by the developer to compile a localized application.

Figure 2:
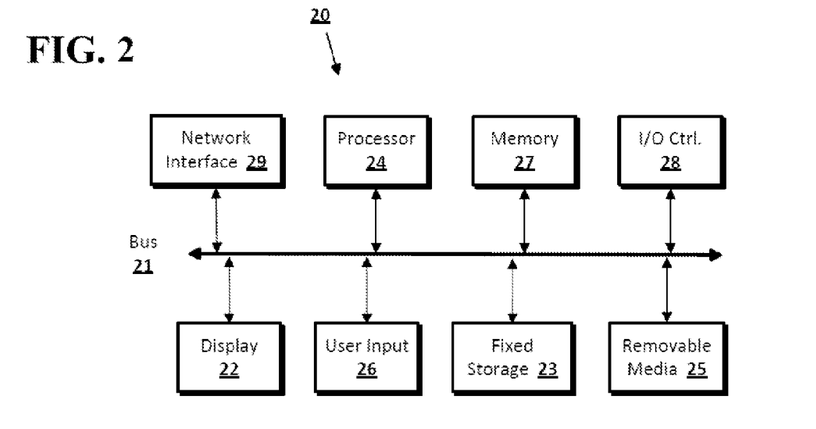
FIG. 2 shows a computer according to an embodiment of the disclosed subject matter.

Embodiments of the presently disclosed subject matter may be implemented in and used with a variety of component and network architectures. FIG. 2 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including a digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 3.

Many other devices or components (not shown) may be connected in a similar manner (e.g., document scanners, digital cameras and so on). Conversely, all of the components shown in FIG. 2 need not be present to practice the present disclosure. The components can be interconnected in different ways from that shown. The operation of a computer such as that shown in FIG. 2 is readily known in the art and is not discussed in detail in this application. Code to implement the present disclosure can be stored in computer-readable storage media such as one or more of the memory 27, fixed storage 23, removable media 25, or on a remote storage location.

Figure 3:
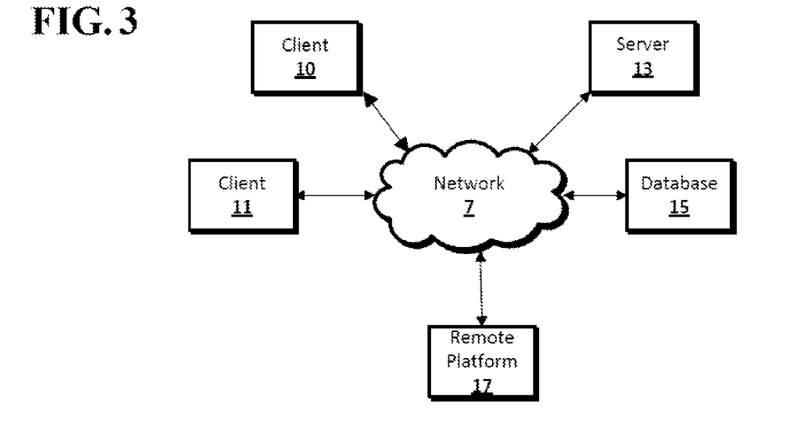
FIG. 3 shows a network configuration according to an embodiment of the disclosed subject matter.

FIG. 3 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description and following appendices, for purpose of explanation, have been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described to explain the principles of embodiments of the disclosed subject matter and their practical applications, to thereby enable others skilled in the art to utilize those embodiments as well as various embodiments with various modifications as may be suited to the particular use contemplated.

The invention claimed is:
1. A method comprising:
receiving a representation of an interface based on at least one application selected from the group consisting of a web-based application, a mobile application, a desktop application and a snapshot;

receiving a resource file containing at least one file resource, wherein the resource file is configured to be compiled with application code to provide elements of the interface for the application and wherein the at least one file resource corresponds to an element of the interface to be localized;

receiving an interface resource based on context information of an interface, wherein the interface resource corresponds to the element of the interface to be localized and wherein the context information includes information extracted by the application that represents at least part of the interface;

rendering an editable version of the interface resource;

receiving a first localization edit of the interface resource from a first user;

receiving a second localization edit of the interface resource from a second user;

selecting a localization edit from among the first and second localization edits based upon the expected accuracy of the first localization edit and the expected accuracy of the second localization edit;

modifying the corresponding file resource in the resource file based on the selected localization edit of the interface resource;

rendering, using a computer processor, a localized interface based on the selected localization edit;

receiving an evaluation message; and compiling a localized version of an application based on the modified resource file.

2. The method of claim 1, further comprising:
comparing the first localization edit to the second localization edit; and
determining a conflict value based on the comparing the first localization edit to the second localization edit.

3. The method of claim 2, further comprising:
determining a rank of the first user;
determining a rank of the second user;
comparing the rank of the first user to the rank of the second user; and
selecting the selected localization edit based on the comparing the rank of the first user to the rank of the second user.

4. The method of claim 3, wherein receiving a localization edit based on the conflict value and the comparing the rank of the first user to the rank of the second user further comprises receiving the localization edit from the user with a lower ranking.

5. The method of claim 1, wherein the interface is based on at least one from the group of a web-based application, a mobile application, a desktop application and a snapshot.

6. The method of claim 1, further comprising:
extracting location data corresponding to the interface resource.

7. The method of claim 1, further comprising:
receiving an evaluation message in response to the first localization edit.

8. The method of claim 7, wherein the evaluation message includes a reject component and further comprising rejecting the first localization edit.

9. The method of claim 7, wherein the evaluation message includes a modification component and further comprising modifying the first localization edit.

10. The method of claim 7, wherein the evaluation message includes an accept component and the method further comprises identifying a file resource that corresponds to the interface resource and modifying the corresponding file resource in the resource file based on the first localization edit of the interface resource.

11. The method of claim 10, wherein at least one of the receiving the first localization edit of the interface resource, modifying the corresponding file resource in the resource file based on the first localization edit of the interface resource, and receiving an evaluation message from at least one evaluator is available to a developer in real-time.

12. The method of claim 10, further comprising:
rendering the modified file resource to at least one developer; and
determining to extract the modified file resource based on the rendering the modified file resource to the at least one developer.

13. The method of claim 10, further comprising compiling a localized version of an application based on the modified resource file.

14. The method of claim 7, wherein receiving an evaluation message from the at least one evaluator further comprises:
receiving a first evaluation message of the message resource from a third user;
receiving a second evaluation message of the message resource from a fourth user;
comparing the first evaluation message to the second evaluation message; and
determining a conflict value based on the comparing the first evaluation message to the second evaluation message.

15. The method of claim 14, further comprising:
determining the rank of the third user;
determining the rank of the fourth user;
comparing the rank of the third user to the rank of the fourth user; and
receiving an evaluation message based on the conflict value and the comparing the rank of the third user to the rank of the fourth user.

16. The method of claim 15, wherein receiving an evaluation message based on the conflict value and the comparing the rank of the third user to the rank of the fourth user further comprises receiving the evaluation message from the user with a lower ranking.

17. A system comprising:
a database storing context information of an interface;
a processor in connection with said database, said processor configured to:
receive a representation of an interface based on at least one application selected from the group consisting of a web-based application, a mobile application, a desktop application and a snapshot;
receive a resource file containing at least one file resource, wherein the resource file is configured to be compiled with application code to provide elements of the interface for the application and wherein the at least one file resource corresponds to an element of the interface to be localized;
receive an interface resource based on the context information of an interface, wherein the interface resource corresponds to the element of the interface to be localized and wherein the context information includes information extracted by the application that represents at least part of the interface;
render an editable version of the interface resource;
receive a first localization edit of the interface resource from a first user;
receive a second localization edit of the interface resource from a second user;

select a localization edit from among the first and second localization edits based upon the expected accuracy of the first localization edit and the expected accuracy of the second localization edit;

render, using a computer processor, a localized interface based on the selected localization edit; receive an evaluation message; and compile a localized version of an application based on the modified resource file.

18. The system of claim 17, said processor further configured to receive an evaluation message in response to the first localization edit.

19. The system of claim 18, wherein the evaluation message includes a reject component, and said processor is further configured to reject the first localization edit.

20. The system of claim 18, wherein the evaluation message includes a modification component, and said processor is further configured to modify the first localization edit.

21. The system of claim 18, wherein the evaluation message includes an accept component and said processor is further configured to identify a file resource that corresponds to the interface resource and modify the corresponding file resource in the resource file based on the first localization edit of the interface resource.

22. The system of claim 21, further configured to:

render the modified file resource to at least one developer; and determine to extract the modified file resource based on rendering the modified file resource to at least one developer.

23. The system of claim 21, wherein the processor is further configured to:

extract location data corresponding to the interface resource.

* * * * *